(12) United States Patent
Sakamoto et al.

(10) Patent No.: US 10,942,545 B2
(45) Date of Patent: Mar. 9, 2021

(54) WEARABLE ELECTRONIC DEVICE

(71) Applicant: CASIO COMPUTER CO., LTD., Tokyo (JP)

(72) Inventors: Kazuya Sakamoto, Kawasaki (JP); Yoshiaki Mochizuki, Hamura (JP); Ryo Oe, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/676,271

(22) Filed: Nov. 6, 2019

(65) Prior Publication Data
US 2020/0150714 A1 May 14, 2020

(30) Foreign Application Priority Data
Nov. 9, 2018 (JP) .............................. JP2018-211347

(51) Int. Cl.
| | | |
|---|---|---|
| *G06F 1/16* | (2006.01) | |
| *A41D 19/00* | (2006.01) | |
| *A41D 19/015* | (2006.01) | |
| *G04G 21/08* | (2010.01) | |
| *G06F 3/01* | (2006.01) | |

(52) U.S. Cl.
CPC ......... *G06F 1/163* (2013.01); *A41D 19/0017* (2013.01); *A41D 19/01523* (2013.01); *G04G 21/08* (2013.01); *G06F 3/014* (2013.01); *G06F 3/017* (2013.01); *G06F 2203/0331* (2013.01)

(58) Field of Classification Search
CPC ....................................................... G06F 1/163
See application file for complete search history.

(56) References Cited

U.S. PATENT DOCUMENTS

2017/0065872 A1* 3/2017 Kelley .................... G06F 1/163

FOREIGN PATENT DOCUMENTS

| DE | 102015214331.7 A1 | 7/2015 |
|---|---|---|
| DE | 102016007990.8 A1 | 6/2016 |
| JP | 2012238224 A | 12/2012 |

OTHER PUBLICATIONS

Schaeffler, machine translation of DE 102015214331 A1, Feb. 2, 2017.*
Extended European Search Report (EESR) dated Apr. 6, 2020 issued in European Application No. 19207836.8.

* cited by examiner

*Primary Examiner* — Gustavo Polo
(74) *Attorney, Agent, or Firm* — Holtz, Holtz & Volek PC

(57) ABSTRACT

A wearable electronic device includes: a terminal main body part configured to execute predetermined processing; a first button for performing an operation input to the terminal main body part; and a wearable member configured to support the terminal main body part and the first button, and capable of being worn on a finger of a wearer. The first button is arranged on the wearable member such that, when the wearable member is worn, the first button is positioned on a nail side around a thumb of the wearer.

14 Claims, 8 Drawing Sheets

WEARABLE ELECTRONIC DEVICE

CROSS-REFERENCE TO RELATED APPLICATIONS

This application is based on and claims priority under 35 USC 119 from Japanese Patent Application No. 2018-211347 filed on Nov. 9, 2018, the contents of which are incorporated herein by reference.

TECHNICAL FIELD

The present disclosure relates to a wearable electronic device.

BACKGROUND ART

In the related art, as an example of a reading device configured to optically read information, a miniaturized handy scanner device is known (for example, JP-A-2012-238224).

In the invention disclosed in JP-A-2012-238224, the handy scanner device is worn on a wrist of one hand by means of a wristband or the like, and an operation input is performed by pressing an operation key provided on the device with a finger of the other hand. For this reason, for example, in a case in which the other hand is blocked by baggage and the like, it is not possible to sufficiently press the operation key, and thereby it is difficult to perform the operation input.

SUMMARY OF INVENTION

A wearable electronic device related to the present disclosure includes: a terminal main body part configured to execute predetermined processing; a first button for performing an operation input to the terminal main body part; and a wearable member configured to support the terminal main body part and the first button, and capable of being worn on a finger of a wearer. The first button is arranged on the wearable member such that, when the wearable member is worn, the first button is positioned on a nail side around a thumb of the wearer.

DESCRIPTION OF EMBODIMENTS

Hereinafter, an exemplary embodiment of the present disclosure will be described in detail with reference to the drawings.

Figure 1:
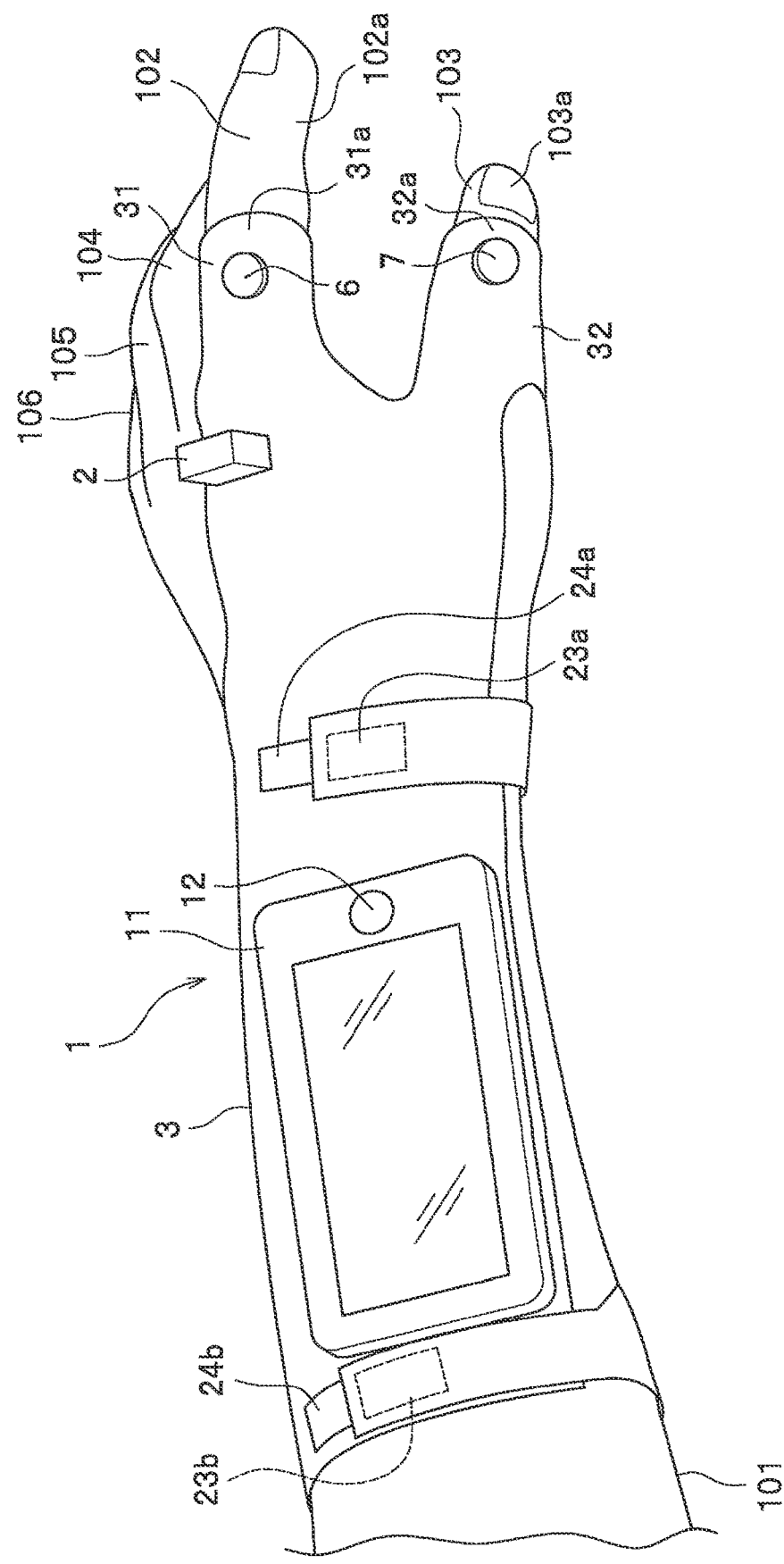
FIG. 1 is a perspective view depicting an entire configuration of a wearable electronic device in accordance with an exemplary embodiment, showing a wearable member.

FIG. 1 is a perspective view depicting an entire configuration of a wearable electronic device in accordance with an exemplary embodiment, showing a wearable member. A wearable electronic device 1 of the exemplary embodiment is used with being worn on an arm part 101 of a wearer (also referred to as a user or an operator). The wearable electronic device 1 includes a scanner 2 functioning as an optical reader configured to read information, a flexible wearable member 3 having a tube-shaped part formed on a tip end and configured to support the scanner 2, a power supply button 7 functioning as a first button, and a scanner trigger 6 functioning as a second button.

Also, the wearable electronic device 1 of the exemplary embodiment includes a display panel 11 provided on the wearable member 3 and functioning as a flat plate-shaped display unit having an input key button 12. Also, the wearable electronic device 1 includes an electronic circuit board 13 (refer to FIG. 2) accommodated in the wearable member 3 and functioning as a terminal main body part, and a battery 15. The electronic circuit board 13 has a control unit (CPU) embedded therein.

Figure 2:
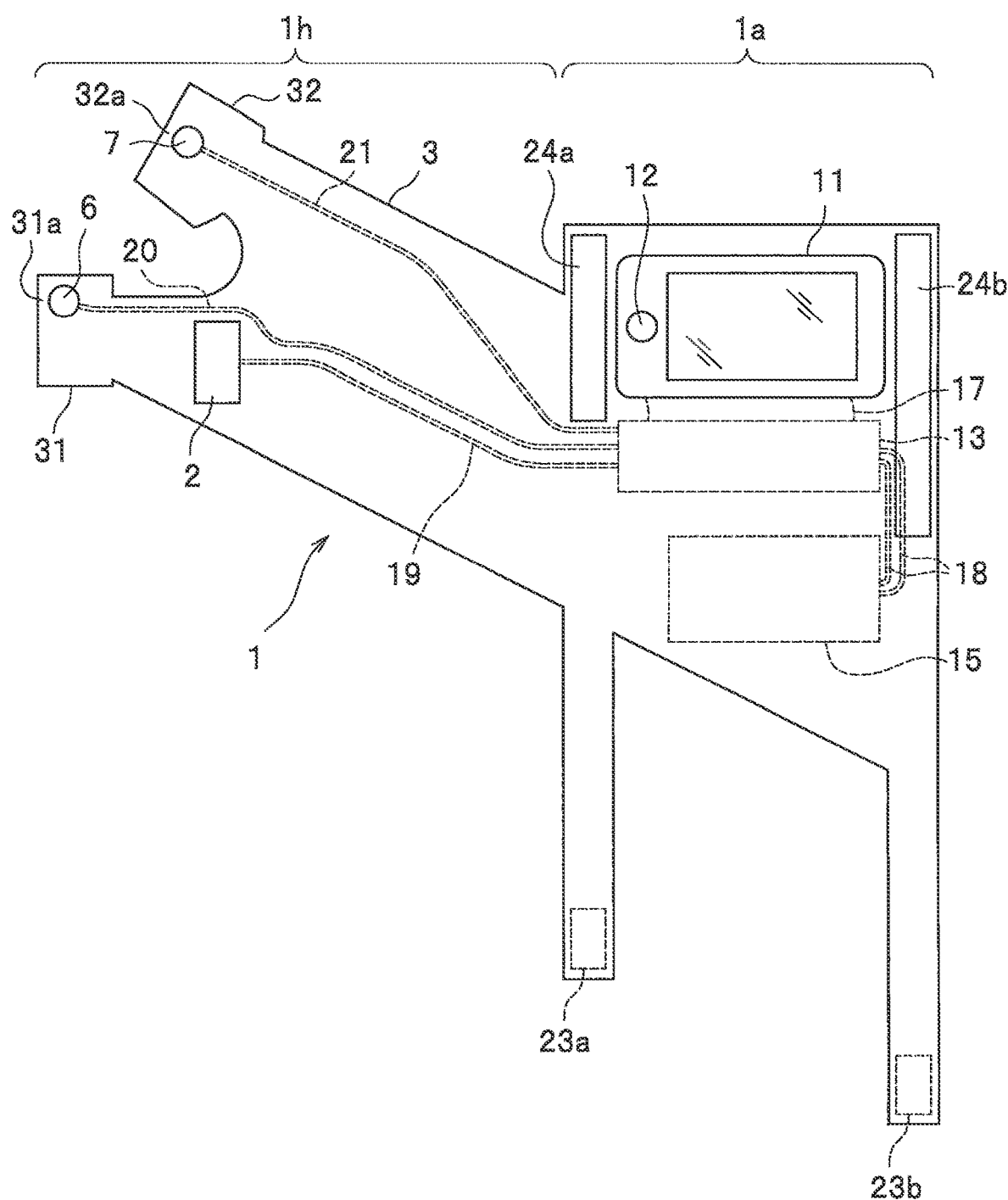
FIG. 2 is a plan view depicting the wearable electronic device of the exemplary embodiment, showing a configuration of a circuit.

As shown in FIG. 2, the wearable electronic device 1 has wirings 17 to 21. The wiring 17 interconnects the display panel 11 and the electronic circuit board 13. The wiring 18 interconnects the battery 15 and the electronic circuit board 13. The wiring 19 interconnects the scanner 2 and the electronic circuit board 13. The wiring 20 interconnects the scanner trigger 6 and the electronic circuit board 13. The wiring 21 interconnects the power supply button 7 and the electronic circuit board 13.

The scanner 2 is configured to scan and decode a barcode or two-dimensional code printed on a label bonded on an article (baggage, manufactured product, commercial product and the like). The wearable electronic device 1 is configured to read the two-dimensional code scanned by the scanner 2, and to transmit the scanned information to a host computer and the like via a communication unit (not shown).

The wearable member 3 has flexibility so as not to hinder an operation of the arm part 101 of the wearer.

In the exemplary embodiment, the wearable member 3 is worn from the arm part 101 of the wearer to a finger of a hand, and is configured by fabric that is used for clothes, for example.

However, the present disclosure is not limited to the above, and the wearable member 3 may be partially or entirely configured by a sheet-shaped member formed of non-woven fabric, synthetic leather, rubber or the like. For the wearable member 3, a material having durability, aeration property, waterproof property and the like is selected depending on uses of the scanner 2.

The wearable member 3 is a component that is to be worn on the arm part 101 of the wearer and enables the scanner 2 to be positioned on the back of the hand of the wearer. As shown in FIG. 2, the wearable member 3 has a hand part 1h configured to cover mainly a part of the hand and finger of the wearer, and a front arm part 1a configured to cover an elbow side, i.e., a front arm.

As shown in FIG. 1, the hand part 1h is formed with an index finger insertion tube part 31 (index finger engagement part) in which an index finger 102 is to be inserted and which has a tube-shaped wide portion formed at a tip end thereof. Also, the hand part 1h is formed with a thumb insertion tube part 32 (thumb engagement part) in which a thumb 103 is to be inserted and which has a tube-shaped wide portion formed at a tip end thereof.

Also, the thumb insertion tube part 32 has such an open shape that a part corresponding to a nail 103a of the thumb 103 of the wearer is opened when wearing the wearable member 3. That is, the thumb insertion tube part 32 has an oven shape of covering up to a half of the distal phalange of the thumb 103 of the wearer when wearing the wearable member 3.

As shown in FIG. 2, the scanner 2 is connected to the scanner trigger 6 via the electronic circuit board 13. The scanner trigger 6 has a circular flat shape, and is arranged on a side surface 31a of the index finger insertion tube part 31.

In a state in which the scanner trigger 6 is not pressed, the scanner 2 does not read the two-dimensional barcode or the like. Also, in a state in which the scanner trigger 6 is pressed, the two-dimensional barcode or the like is read by the scanner 2. Like this, the scanner trigger 6 is provided so as to control the reading operation of the scanner 2.

When wearing the wearable member 3 on a hand of the wearer, the index finger 102 of the wearer is inserted in the index finger insertion tube part 31. At this time, as shown in FIG. 1, the scanner trigger 6 is arranged on a thumb 103-side side surface (side surface 102a) on the proximal phalange (between the second joint and the third joint) of the index finger 102.

Like this, when the wearable member 3 is worn, the scanner trigger 6 is arranged on the thumb 103-side on the proximal phalange of the index finger 102 of the wearer. Thereby, the wearer of the wearable member 3 can operate the scanner trigger 6 by a simple operation of just pressing the ball of the thumb 103 against the side surface 102a of the index finger 102.

Also, with the above configuration, for example, even when carrying predetermined baggage with wearing the wearable member 3 while supporting the same with both palms, the baggage does not interfere with the scanner trigger 6, and thereby there is no risk of erroneous operation.

Returning to FIG. 2, the power supply button 7 functioning as a first button for turning on and off a power supply of the terminal main body part has a circular flat shape, and is arranged on an upper surface 32a side of the thumb insertion tube part 32 of the wearable member 3.

The power supply button 7 is connected to the scanner 2 via the electronic circuit board 13. When the power supply button 7 is pressed, it is possible to switch on and off states of the terminal main body part, thereby selecting a standby state (ON state) in which a reading operation can be performed by operating the scanner trigger 6 and a stop state (OFF state) in which the reading operation cannot be performed.

When the wearable member 3 is worn on the hand of the wearer, the thumb 103 of the wearer is inserted in the thumb insertion tube part 32. At this time, as shown in FIG. 1, the power supply button 7 is arranged on the nail 103a-side on the distal phalange (the further fingertip than the first joint) of the thumb 103.

By the above configuration, the wearer of the wearable member 3 can operate the power supply button 7 with the ball of the index finger 102 by a simple operation of lightly bending the second joint and the third joint of the index finger 102 while lightly bending the first joint and the second joint of the thumb 103.

Also, even when carrying predetermined baggage with wearing the wearable member 3 while supporting the same with both palms, the baggage does not interfere with the power supply button 7, and thereby there is no risk of erroneous operation.

Also, surface fasteners (hooks) 23a and 23b and surface fasteners (loops) 24a and 24b configured to detachably engage with each other with the wearable member 3 being wound around the arm are sewn to front and back surfaces of the wearable member 3, respectively.

Subsequently, operations are described when wearing the wearable electronic device 1 of the exemplary embodiment.

As shown in FIG. 1, the wearer winds the wearable member 3 of the wearable electronic device 1 of the exemplary embodiment around the arm part 101 and then engages the surface fasteners (hooks) 23a and 23b with the surface fasteners (loops) 24a and 24b.

At this time, when the wearer inserts the index finger 102 into the index finger insertion tube part 31, the index finger insertion tube part 31 is worn to cover an outer peripheral surface of the index finger 102. When the wearer inserts the thumb 103 into the thumb insertion tube part 32, the thumb insertion tube part 32 is worn to cover an outer peripheral surface of the thumb 103.

Thereby, when the wearable member 3 is worn, as shown in FIG. 1, the scanner trigger 6 arranged on the side surface 31a of the index finger insertion tube part 31 of the wearable member 3 is arranged on the thumb 103-side side surface (side surface 102a) on the proximal phalange (between the second joint and the third joint) of the index finger 102 of the wearer.

Also, when the wearable member 3 is worn, as shown in FIG. 1, the power supply button 7 arranged on the upper surface 32a of the thumb insertion tube part 32 of the wearable member 3 is arranged on the nail 103a side on the distal phalange (the further fingertip than the first joint) of the thumb 103 of the wearer. The scanner 2 is arranged to be positioned on the back of the hand of the wearer.

Also, when the wearable member 3 of the wearable electronic device 1 of the exemplary embodiment is wound and worn on the arm part 101, a position of the wearable member 3 around the arm part 101 is defined by the index finger insertion tube part 31 and the thumb insertion tube part 32. For this reason, when taking a posture in which an operation is performed with positioning the arm part 101 in front of the body, the display panel 11 and the input key button 12 are arranged slightly inward on an upper surface of the arm part 101 and thereby they can be easily operated with facing toward a face of the wearer.

Figure 3:
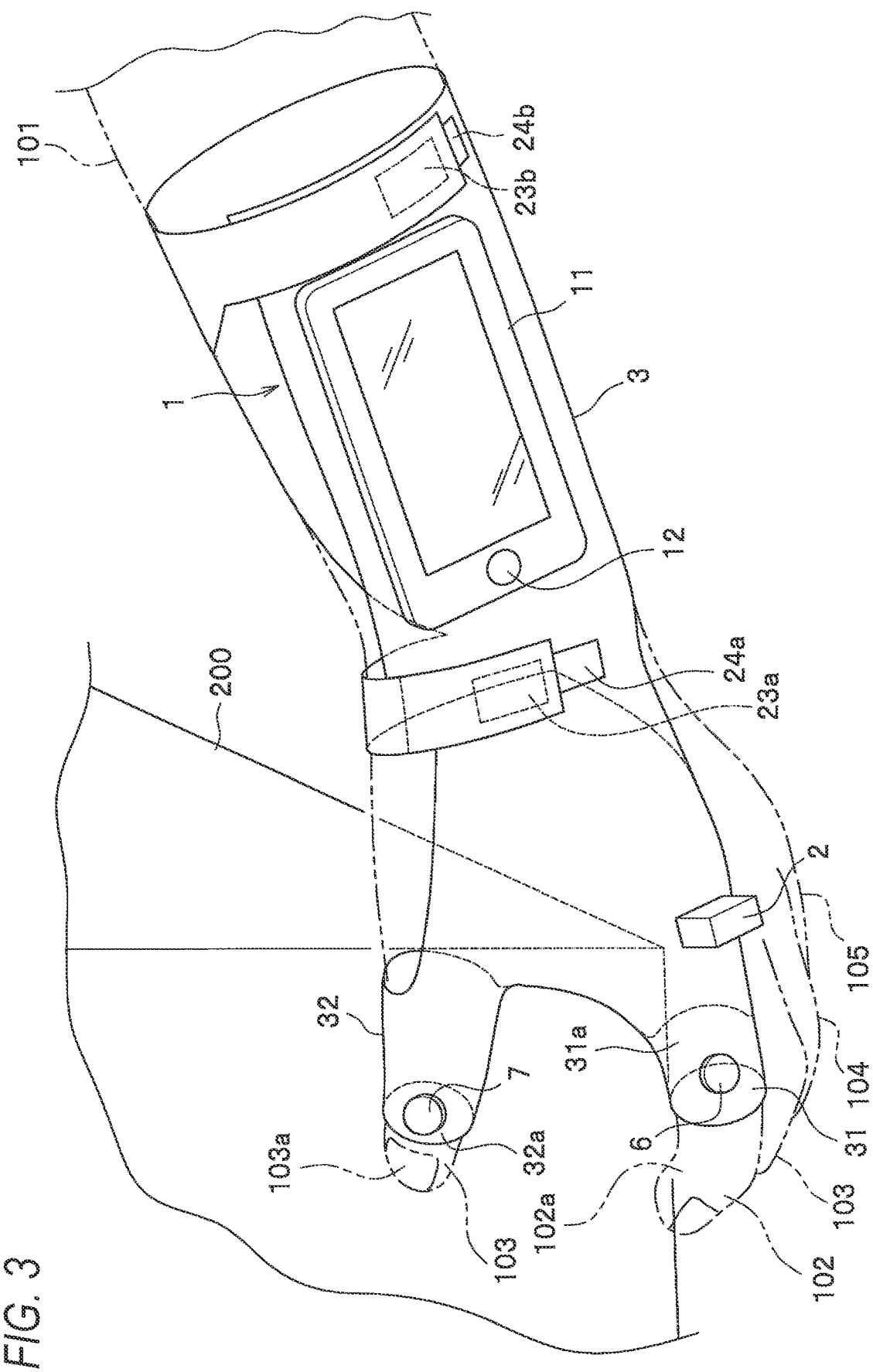
FIG. 3 is a perspective view depicting the wearable electronic device of the exemplary embodiment, showing an aspect of gripping baggage by a wearer.

As shown in FIG. 3, when carrying the baggage 200 with supporting the same with both palms, the wearer of the wearable electronic device 1 supports the baggage 200 with contacting the balls of the fingers to the baggage.

Also in this case, the scanner trigger 6 and the power supply button 7 are arranged on the side surface 31a of the index finger insertion tube part 31 and the nail-side upper surface 32a of the thumb insertion tube part 32, and are not provided on parts, which correspond to the balls of the fingers, of the index finger insertion tube part 31 and the thumb insertion tube part 32.

For this reason, the scanner trigger 6 and the power supply button 7 are difficult to interfere with the baggage 200, and thereby there is no risk of erroneous operations of the scanner trigger 6 and the power supply button 7.

Also, the display panel 11 and the input key button 12 are provided in positions corresponding to a side surface of the arm part 101. For this reason, there is little possibility that the display panel 11 and the input key button 12 will contact the baggage 200 and other articles, and thereby an operation can be easily performed.

Figure 4:
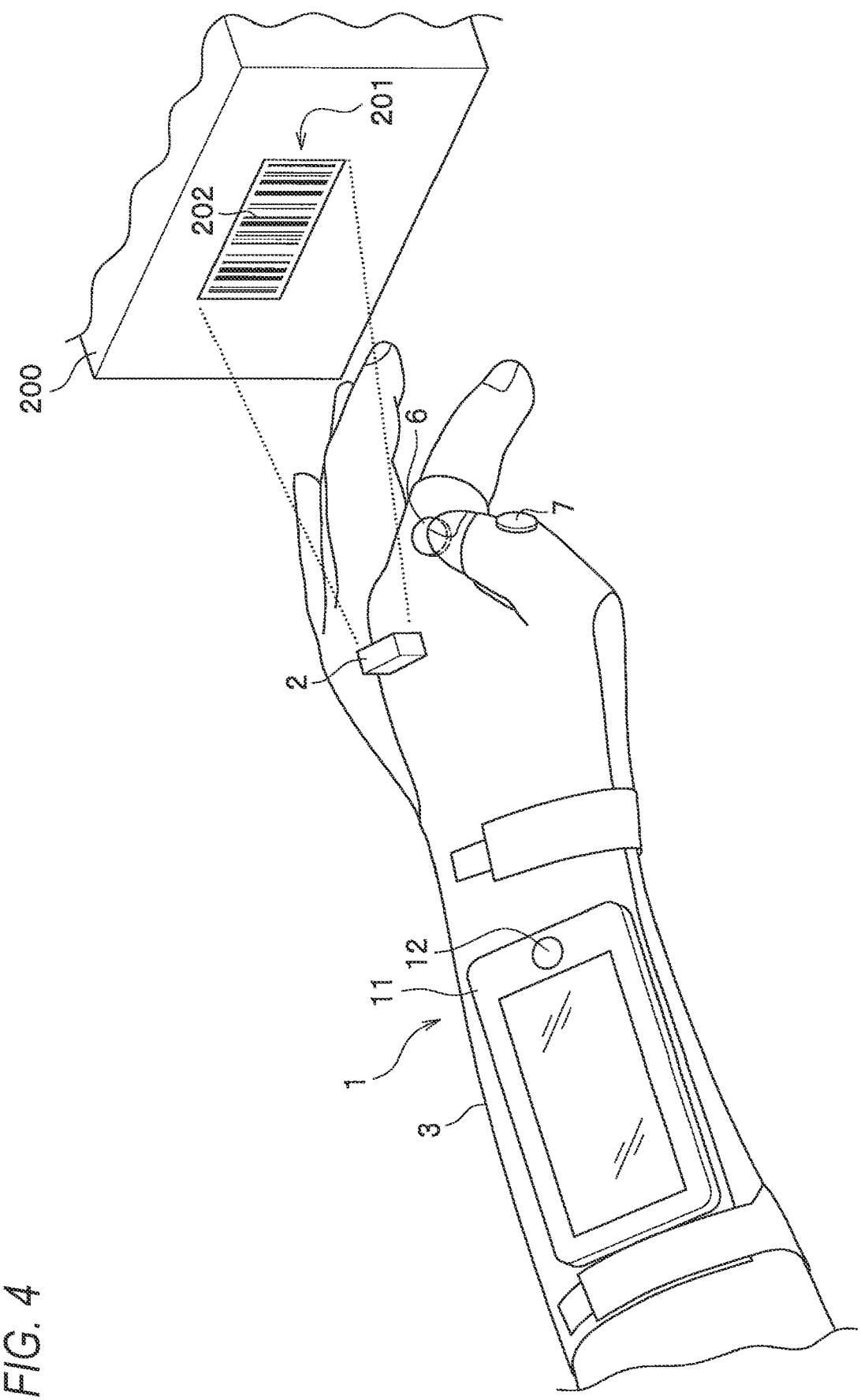
FIG. 4 is a perspective view depicting the wearable electronic device of the exemplary embodiment, showing an aspect of reading a barcode.
Figure 5:
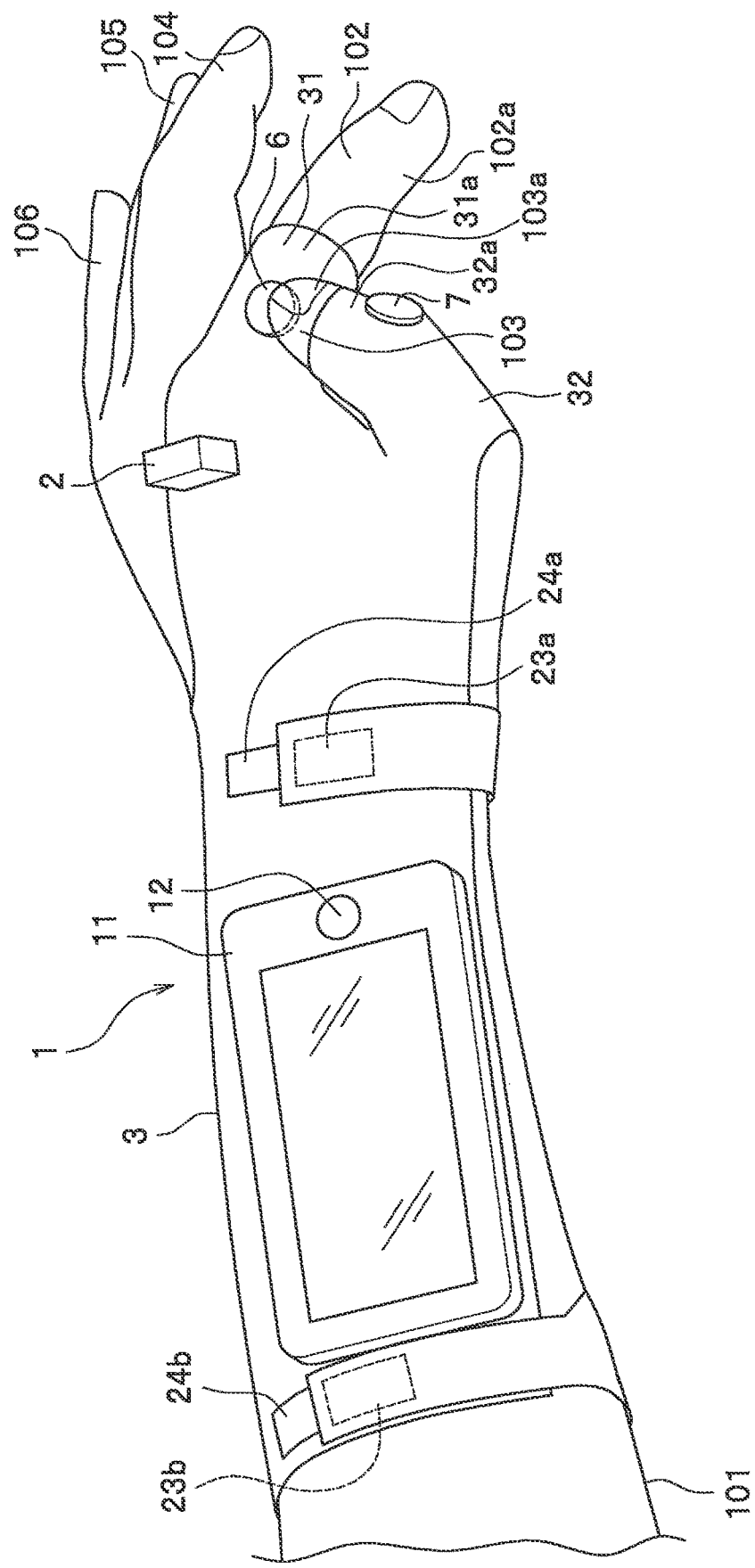
FIG. 5 is a perspective view depicting the wearable electronic device of the exemplary embodiment, showing an aspect of operating a scanner trigger.
Figure 6:
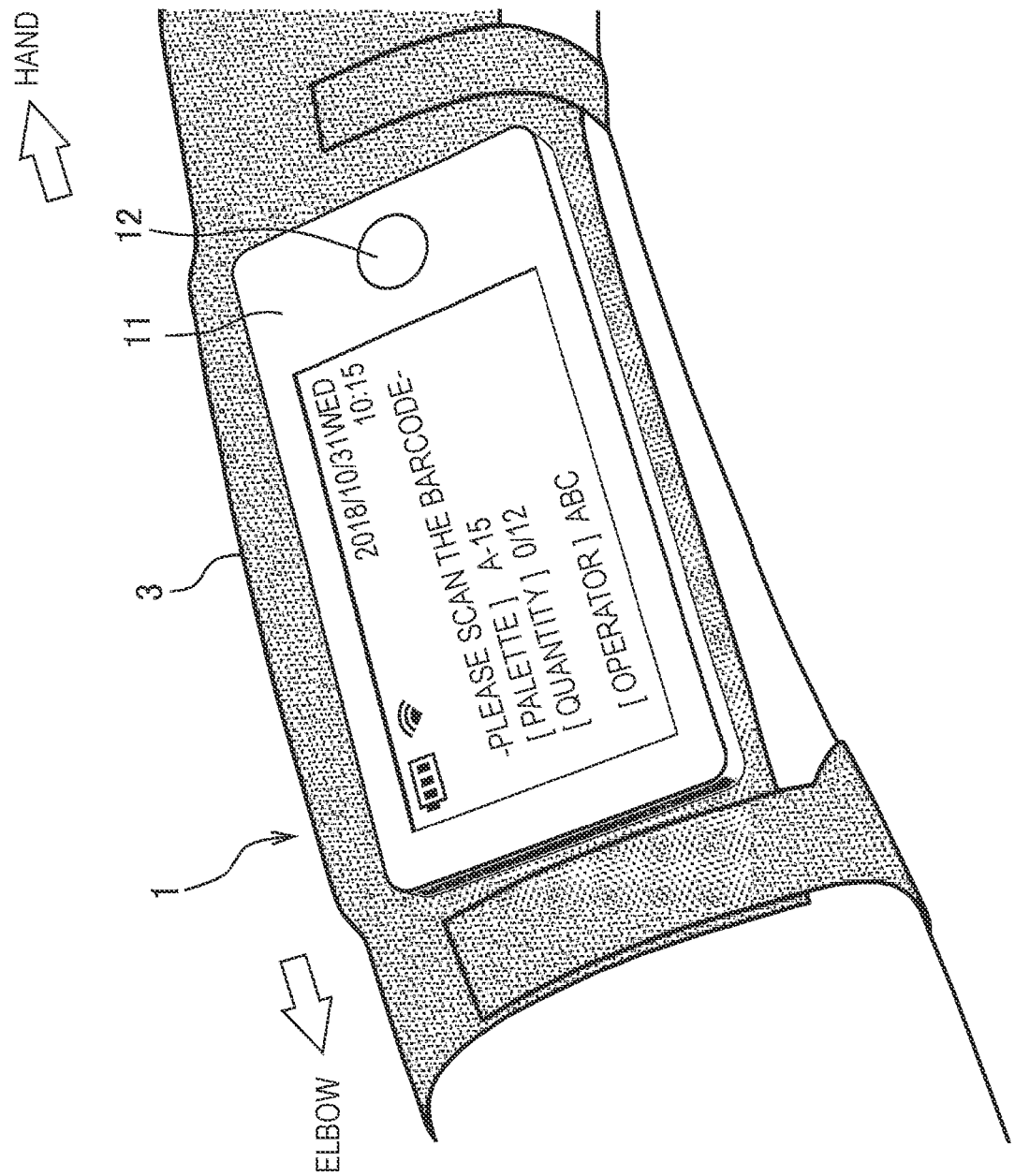
FIG. 6 is an external view depicting the wearable electronic device of the exemplary embodiment, showing a display unit from a user's viewpoint.

FIG. 4 is a perspective view depicting the wearable electronic device 1 of the exemplary embodiment, showing an aspect of reading a barcode 201. FIG. 5 is a perspective view depicting the wearable electronic device 1 of the exemplary embodiment, showing an aspect of operating a scanner trigger 6. When the power supply button 7 is pressed to turn on the terminal main body part, the wearable electronic device 1 displays information for urging a next operation on the display panel 11, as shown in FIG. 6. Herein, a message "Please scan the barcode" is displayed. Also, herein, auxiliary information for a reading operation, such as a palette number, a quantity of articles to be read, an operator's name and the like, is displayed.

In the meantime, a configuration is also possible in which when the input key button 12 provided on the display panel 11 is pushed long, the terminal main body part is turned on.

When reading the barcode 201 bonded on the baggage 200, the wearer can press the scanner trigger 6 arranged on the side surface 31a of the index finger insertion tube part 31 by using the ball of the thumb 103 even while the spot light is being emitted to the barcode 201 from the scanner 2. At this time, a shaking amount of an optical axis of the scanner 2 arranged on the back of the hand can be suppressed small. Like this, the wearable electronic device 1 can change whether or not to read the information of the barcode 201 and the like by operating the scanner trigger 6 with a small amount of movement of the finger.

Figure 7:
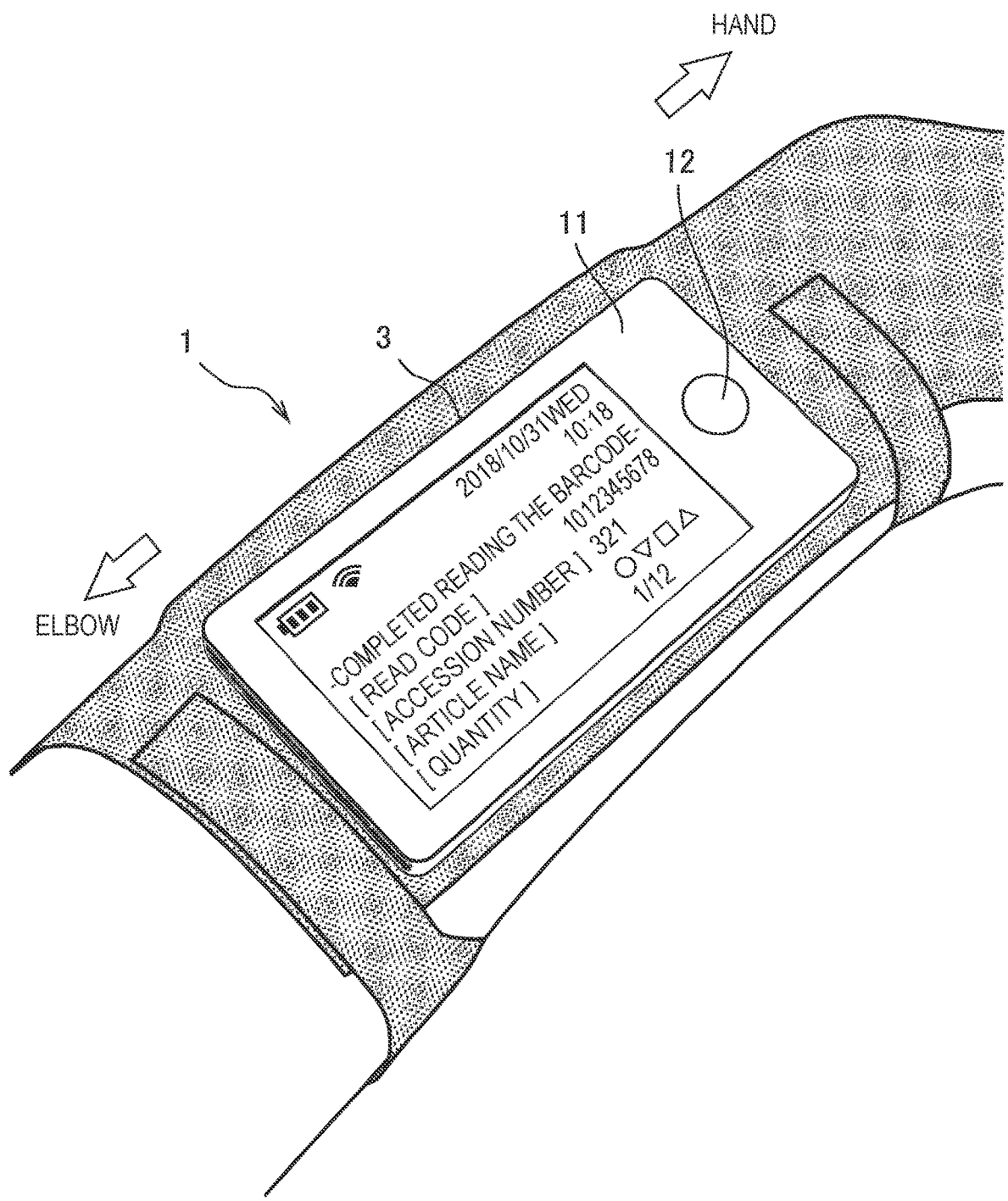
FIG. 7 is a perspective view depicting the wearable electronic device of the exemplary embodiment, showing a display example on the display unit from the user's viewpoint.

When the reading is completed, the article information is displayed in a predetermined format on the display panel 11, as shown in FIG. 7. Herein, a message "completed reading the barcode" is displayed. Also, herein, a read code, an accession number, an article name and a quantity are displayed, and the simple article information about the read article is displayed.

The wearable electronic device 1 stores the information in a storage, and may also transmit the information from the communication unit (not shown) to a host computer.

Figure 8:
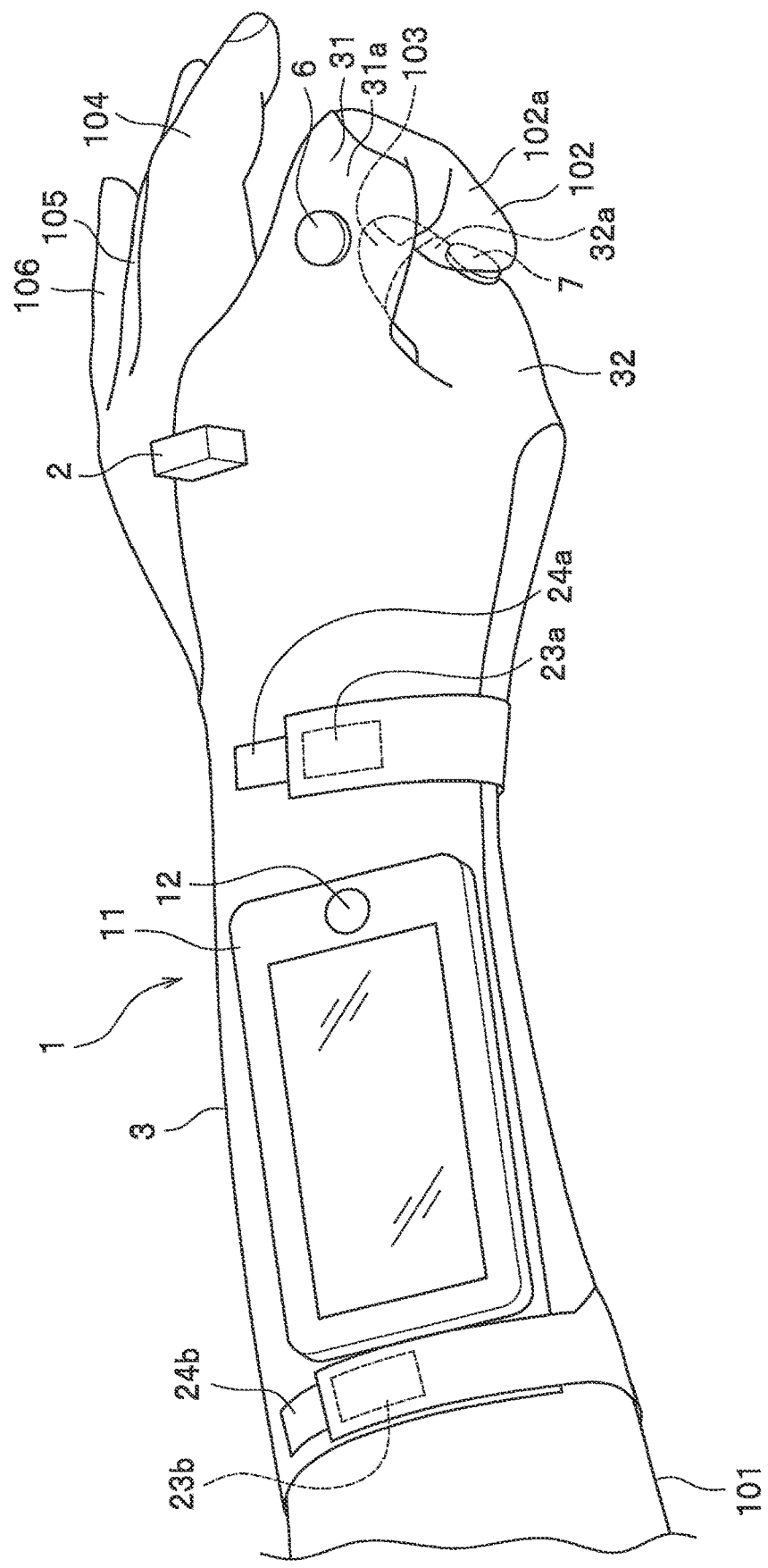
FIG. 8 is a perspective view depicting the wearable electronic device of the exemplary embodiment, showing an aspect of operating a power supply button.

Also, as shown in FIG. 8, in a state in which the joint of the thumb 103 is bent, the wearer brings the index finger 102 close to the upper surface 32a on the nail side of the thumb 103, and presses the power supply button 7 arranged on the upper surface 32a of the thumb insertion tube part 32 by using the ball part of the index finger 102. Thereby, it is possible to operate the power supply button 7 with a small amount of movement of the finger.

Subsequently, operations of the wearable electronic device 1 of the exemplary embodiment are described in accordance with a reading operation sequence by the scanner 2.

As shown in FIG. 1, in a state in which the scanner trigger 6 is not pressed, the scanner 2 does not read the two-dimensional barcode and the like. Also, in a state in which the power supply button 7 is not turned on, the reading is not performed even when the scanner trigger 6 is pressed.

For this reason, even if the scanner trigger 6 or the power supply button 7 is pressed due to an erroneous operation, the reading is not performed. Therefore, it is possible to reduce a risk that the reading will start due to the erroneous operation.

When performing the reading, the power supply button 7 is first pressed to turn on the terminal main body part, as shown in FIG. 8.

When the power supply of the terminal main body part is turned on, the display panel 11 displays a date and current time, a remaining battery level of the battery 15, a communication state of wireless LAN, a message and the like, based on signals from the control unit of the electronic circuit board 13, and is in the standby state.

Then, as shown in FIG. 4, the scanner trigger 6 is pressed while arranging the scanner 2 such that the spot light is to be emitted to the barcode 201, which is a reading target bonded on the baggage 200, and thereby the standby state is released. Thereby, in a state in which the scanner trigger 6 is pressed, the two-dimensional barcode and the like can be read by the scanner 2.

That is, in a case in which the device main body part is in the on state and an operation on the scanner trigger 6 is effective, a signal resulting from the pressing on the scanner trigger 6 is input to the control unit of the electronic circuit board 13.

Thereby, the control unit feeds power from the battery 15 to the scanner 2, thereby emitting the spot light. Also, at this time, the display panel 11 may display that the scanner 2 is under imaging (scanning).

In a case in which an image 202 having a specific element such as a barcode is present in an irradiation region of the spot light emitted from the scanner 2, an electric signal of the read information is output from the scanner 2 to the control unit of the electronic circuit board 13, and then the control unit turns off the spot light of the scanner 2 and is again in the standby state.

In the meantime, the device main body part may have configurations in which the scanner 2 can perform the imaging only while the scanner trigger 6 is pressed, in which a continuous imaging state and the standby state are alternately switched by a single pressing operation on the scanner trigger 6, and in which any one of the configurations can be selected by a mode change with an operation on the input key button 12.

Also, while performing the reading, the scanner 2 is positioned on the back of the hand on which the scanner is difficult to move by movement of the index finger 102 or the thumb 103 upon the pressing on the scanner trigger 6. For this reason, even when the scanner trigger 6 is operated, hand shake does not occur back and forth and around.

Therefore, it is possible to increase reading accuracy of the scanner 2, thereby improving the efficiency.

The information read by the scanner 2 is input to the control unit, as an electric signal. The control unit processes the electric signal input from the scanner 2, thereby generating the article information. The control unit displays the article information in a predetermined format on the display panel 11, as shown in FIG. 7. Also, the article information may be stored in the storage or may be transmitted from the communication unit (not shown) to the host computer.

As shown in FIG. 8, after the reading operation is completed, when the power supply button 7 is pressed to transmit a signal to the electronic circuit board 13, the control unit switches the terminal main body part from the standby state (ON state) to the stop state (OFF state) in which the reading operation cannot be performed. Thereby, the operation of the wearable electronic device 1 is stopped.

The auxiliary information and article information displayed on the display panel 11 of the exemplary embodiment can be easily read and the operability can be thus improved because the display panel 11 is arranged slightly inward on the upper surface of the arm part 101, on which the display panel faces toward the face of the wearer and can be easily operated.

Also, since the scanner trigger 6 is arranged on the side surface 31a of the index finger insertion tube part 31 of the wearable member 3 positioned on the proximal phalange of the index finger 102 and has a circular flat shape, it can be easily pressed simply by slightly bending the thumb 103.

Also, since the power supply button 7 is arranged on the upper surface 32a of the thumb insertion tube part 32 of the wearable member 3 positioned on the nail 103a side on the distal phalange of the thumb 103 and has a circular flat shape, it can be easily pressed by a simple operation of lightly bending the second joint and the third joint of the index finger 102.

Since the wearable member 3 is configured by fabric, it is easily bent. For this reason, upon the input, the operability is not deteriorated.

Also, the wearable member 3 is wound around the arm part 101 and the surface fasteners (hooks) 23a and 23b and the surface fasteners (loops) 24a and 24b are engaged with each other, and thereby the wearable member is worn. For this reason, it is possible to adjust an amount of the winding in conformity to a thickness of the arm part 101 of the wearer, and thereby it is possible to secure the favorable adaptation to wearers having different physiques.

Also, the scanner trigger 6 and the power supply button 7 have small dimensions in height direction. In the exemplary embodiment, the display panel 11 is arranged on the same wearable member 3, together with the scanner trigger 6 and the power supply button 7.

When the wearer wears the wearable member 3 from the arm part 101 to the fingers, the scanner trigger 6 is arranged on the side surface of the proximal phalange of the index finger 102 and the power supply button 7 is arranged on the nail 103a-side on the distal phalange of the thumb 103. Also, the display panel 11 is arranged slightly inward on the upper surface of the arm part 101. The display panel 11 has a flat plate shape, is thin and has a small dimension in height direction.

For this reason, even when supporting and carrying the baggage 200, the scanner trigger 6, the power supply button 7 and the display panel 11 are difficult to interfere with the baggage 200 and other article, as compared to other devices having large outer diameter dimension and dimension in height direction, such as a scanner device having a ring shape and to be fitted on a finger and a display device to be worn on a wrist.

Therefore, it is possible to provide the wearable electronic device 1 capable of performing the operation input easily and appropriately, and having favorable operability.

The present disclosure is not limited to the exemplary embodiment, and can be diversely changed and modified without departing from the gist of the present disclosure. For example, the exemplary embodiment has been described in detail so as to easily understand the gist of the present disclosure. For this reason, the present disclosure is not limited as having all the constitutional elements described above. Also, the present disclosure may add the other constitutional element to any constitutional element or change some constitutional elements into other constitutional elements. Also, the present disclosure may omit some constitutional elements.

In the exemplary embodiment, the power supply button 7 is arranged on the nail 103a-side on the distal phalange (the further fingertip than the first joint) of the thumb 103 when the wearable member 3 is worn on the hand of the wearer. However, the present disclosure is not limited thereto. For example, the power supply button 7 may be arranged on the nail 103a-side on the proximal phalange (the further fingertip than the second joint) of the thumb 103 or may be arranged on the nail 103a-side around the thumb 103.

Also, in the exemplary embodiment, the scanner trigger 6 is arranged on the side surface 31a of the index finger insertion tube part 31. Also, the power supply button 7 is arranged on the upper surface 32a of the thumb insertion tube part 32, which corresponds to the nail 103a-side of the thumb 103. However, the present disclosure is not particularly limited thereto. For example, the scanner trigger 6 and the power supply button 7 may be arranged in opposite positions to each other or may be arranged on only one side.

Also, the scanner trigger 6 is arranged on the side surface 31a of the index finger insertion tube part 31. However, the present disclosure is not particularly limited thereto. For example, the scanner trigger may be arranged on a part of the wearable member 3 corresponding to a side surface, which faces toward the thumb, of each of a middle finger 104 to a little finger 106. Also, when the scanner trigger 6 is arranged on a part, which corresponds to a part between the first joint and the second joint, of the side surface, it can be more easily pressed.

The places on which the scanner trigger 6 and the power supply button 7 are provided may be a side surface or upper surface of a tube-shaped part corresponding to a finger, are not limited to the surface side of the wearable member 3, and may be provided between a plurality of fabrics or on a back surface side. That is, the shape, number and material of the button are not particularly limited to the exemplary embodiment.

Also, in the exemplary embodiment, the power supply button 7 has been described as a button having a function of turning on and off the power supply of the terminal main body part of the wearable electronic device 1. However, the present disclosure is not particularly limited thereto. For example, a button having a function of stopping and starting the display of the display panel 11 is also possible. The power supply button 7 may be configured to function as a display control button for stopping or starting the display of the display panel 11. Also, the power supply button 7 may have both the function of turning on and off the power supply of the terminal main body part and the function as a display control button for stopping or starting the display of the display panel 11. In this case, when the power supply button 7 is pressed long (for example, 2 seconds or longer), the on and off states of the power supply may be switched, and when the power supply button 7 is pressed short (for example, shorter than 2 second), the stop and start of the display of the display panel 11 may be switched. That is, the function of the button can be arbitrarily set.

Although the exemplary embodiments of the present disclosure have been described, the present disclosure is not limited thereto, and includes the inventions defined in the claims and the equivalents thereto.

What is claimed is:

1. A wearable electronic device comprising:
a terminal main body part configured to execute predetermined processing;
an optical reader configured to read information;
a first button for performing a first operation input to the terminal main body part;
a second button for performing a second operation input to the terminal main body part; and
a wearable member configured to support the terminal main body part, the optical reader, the first button, and the second button, the wearable member being capable of being worn on at least a thumb and an index finger of a wearer, wherein the first button is arranged on the wearable member such that, when the wearable member is worn, the first button is positioned on a nail side around the thumb of the wearer, wherein the second button is arranged on the wearable member such that, when the wearable member is worn, the second button is positioned on a thumb side around the index finger of the wearer, and wherein the second button is operable to control a reading operation of the optical reader as the second operation input, and the first button is operable to control an operation different from the reading operation as the first operation input.

2. The wearable electronic device according to claim 1, wherein the first button is arranged on the wearable member such that, when the wearable member is worn, the first button is positioned on the nail side on a distal phalange of the thumb of the wearer.

3. The wearable electronic device according to claim 1, wherein the wearable member has a thumb engagement part having a tube shape and provided so as to engage with the thumb of the wearer, and wherein the first button is provided on the thumb engagement part.

4. The wearable electronic device according to claim 1, wherein the first button is a power supply button for turning on or off a power supply of the terminal main body part.

5. The wearable electronic device according to claim 1, wherein the first button is a display control button for stopping or starting display by a display unit of the terminal main body part.

6. The wearable electronic device according to claim 1, wherein the first button is arranged on the wearable member such that, when the wearable member is worn, the first button is positioned on the nail side on a proximal phalange of the thumb of the wearer.

7. The wearable electronic device according to claim 1, wherein the second button is arranged on the wearable member such that, when the wearable member is worn, the second button is positioned on the thumb side on a proximal phalange of the index finger of the wearer.

8. The wearable electronic device according to claim 1, wherein the wearable member has an index finger engagement part having a tube shape and provided so as to engage with the index finger of the wearer, and wherein the second button is provided on the index finger engagement part.

9. The wearable electronic device according to claim 1, wherein the second button is a scanner trigger for enabling the optical reader to start the reading operation.

10. The wearable electronic device according to claim 1, wherein the wearable member is flexible at least partially.

11. A wearable electronic device comprising:
an optical reader configured to read information;
a display unit configured to display the information read by the optical reader;
a second button for controlling a reading operation of the optical reader;
a first button for controlling an operation different from the reading operation; and
a wearable member configured to support the optical reader, the display unit, the first button, and the second button, the wearable member being capable of being worn from a front arm to at least a thumb and an index finger of a wearer, wherein the display unit is arranged on the wearable member such that, when the wearable member is worn, the display unit is positioned on the front arm of the wearer, wherein the first button is arranged on the wearable member such that, when the wearable member is worn, the first button is positioned on a nail side around the thumb of the wearer, and wherein the second button is arranged on the wearable member such that, when the wearable member is worn, the second button is positioned on a thumb side around the index finger of the wearer.

12. The wearable electronic device according to claim 11, wherein the optical reader is arranged on the wearable member such that, when the wearable member is worn, the optical reader is positioned on a back of a hand of the wearer.

13. The wearable electronic device according to claim 11, wherein the wearable member has an index finger engagement part having a tube shape and provided so as to engage with the index finger of the wearer, and wherein the second button is provided on the index finger engagement part.

14. The wearable electronic device according to claim 11, wherein the wearable member is flexible at least partially.

* * * * *